US012046804B2

(12) United States Patent
Huang et al.

(10) Patent No.: US 12,046,804 B2
(45) Date of Patent: Jul. 23, 2024

(54) COMPACT AUTOMOBILE START SWITCH WITH ANTENNA

(71) Applicant: Valeo Comfort Driving Assistance Systems (Guangzhou) Co., Ltd., Guangzhou (CN)

(72) Inventors: Changgui Huang, Shenzhen (CN); Hongli Chen, Shenzhen (CN); Junge Chen, Guangzhou (CN); Yibin Su, Guangzhou (CN); Takeshi Takada, Kumagaya (JP); Sangchul Park, Anyang-si (KR)

(73) Assignee: Valeo Comfort Driving Assistance Systems (Guangzhou) Co., Ltd., Guangzhou (CN)

( * ) Notice: Subject to any disclaimer, the term of this patent is extended or adjusted under 35 U.S.C. 154(b) by 34 days.

(21) Appl. No.: 17/910,170

(22) PCT Filed: Mar. 11, 2021

(86) PCT No.: PCT/CN2021/080161
§ 371 (c)(1),
(2) Date: Sep. 8, 2022

(87) PCT Pub. No.: WO2021/180159
PCT Pub. Date: Sep. 16, 2021

(65) Prior Publication Data

US 2023/0089876 A1 Mar. 23, 2023

(30) Foreign Application Priority Data

Mar. 11, 2020 (CN) ......................... 202010165984.4

(51) Int. Cl.
*H01Q 1/32* (2006.01)

(52) U.S. Cl.
CPC ......... *H01Q 1/3241* (2013.01); *H01Q 1/3291* (2013.01)

(58) Field of Classification Search
CPC ..... H01Q 1/3241; H01Q 1/3291; H01H 13/14
See application file for complete search history.

(56) References Cited

U.S. PATENT DOCUMENTS 4,651,140 A * 3/1987 Duggan ................. H01H 37/36 29/512
5,118,909 A * 6/1992 Husting .................. H01H 3/24 200/81 R (Continued)

FOREIGN PATENT DOCUMENTS

CN 102903555 A 1/2013
CN 106104733 A 11/2016

(Continued)

OTHER PUBLICATIONS

International Search Report and Written Opinion in corresponding International Application No. PCT/CN2021/080161, mailed May 26, 2021 (8 pages).

(Continued)

*Primary Examiner* — Ricardo I Magallanes
*Assistant Examiner* — Jordan E. DeWitt
(74) *Attorney, Agent, or Firm* — Osha Bergman Watanabe & Burton LLP

(57) ABSTRACT

A compact automobile start switch with antenna including a button, a push switch assembly and an antenna assembly module is disclosed. The antenna assembly module is provided with an accommodating cavity in which the push switch assembly is arranged. The antenna assembly module includes an antenna module body, an antenna coil and a connector terminal. The antenna module body is provided with a winding area in which the antenna coil is arranged and a connector matching portion in which the antenna (Continued)

connector terminal is arranged. The antenna connector terminal comprises a connecting section, a fixing section and a terminal welding section and the antenna coil is directly connected with the terminal welding portion by a wire. The antenna coil is directly connected to the antenna connector terminal through the wire outside the antenna module body. The process of connecting the antenna module to the circuit of the PCBA is eliminated.

9 Claims, 3 Drawing Sheets

(56) References Cited

U.S. PATENT DOCUMENTS

| | | | | | |
|---|---|---|---|---|---|
| 5,693,926 | A * | 12/1997 | Cassidy | G01L 13/02<br>73/745 |
| 10,157,715 | B2 * | 12/2018 | Okuda | H01H 13/04 |
| 2014/0224631 | A1 | 8/2014 | Hanaoka | |
| 2014/0322979 | A1 * | 10/2014 | Ikeda | H01H 37/764<br>439/620.29 |
| 2015/0214606 | A1 * | 7/2015 | Sano | H01H 13/023<br>343/720 |
| 2015/0337788 | A1 * | 11/2015 | Sago | H01Q 1/3291<br>123/179.1 |
| 2017/0018377 | A1 | 1/2017 | Okuda et al. | |
| 2018/0047528 | A1 * | 2/2018 | Yamamoto | H01Q 1/3291 |
| 2019/0229394 | A1 | 7/2019 | Joseph et al. | |
| 2021/0188393 | A1 * | 6/2021 | Hahn | H01Q 1/2283 |
| 2021/0304985 | A1 * | 9/2021 | Yamagata | H05K 7/1427 |
| 2023/0089876 | A1 * | 3/2023 | Huang | H01Q 1/22<br>343/713 |

FOREIGN PATENT DOCUMENTS

| | | | | |
|---|---|---|---|---|
| CN | 205692242 U | | 11/2016 | |
| CN | 111446096 A | * | 7/2020 | H01H 13/02 |
| CN | 111446096 A | | 7/2020 | |
| CN | 212542232 U | | 2/2021 | |
| JP | 2011/169180 A | | 9/2011 | |
| WO | WO-2011102284 A1 | * | 8/2011 | B60R 25/045 |
| WO | 2015/137239 A1 | | 9/2015 | |

OTHER PUBLICATIONS

Extended Eurpoean Seach Report Issued in Corresponding European Application No. 21768758.1, dated Feb. 19, 2024. (11 Pages).

Office Action issued in Corresponding Japanese Patent Application No. 2022-554818, dated Feb. 27, 2024. (7 pages with English Translation).

* cited by examiner

COMPACT AUTOMOBILE START SWITCH WITH ANTENNA

FIELD OF INVENTION

The disclosure relates to an automobile start switch, in particular to a compact automobile start switch with antenna.

BACKGROUND

With the development of automobile technology, the electrical requirements are getting higher and higher, and more and more automobiles are equipped with keyless entry and start system. More and more original equipment manufacturers integrate the backup antenna of the keyless entry and start system into the start switch to reduce costs, reduce layout space, improve product reliability, and shorten development cycles.

At present, the automobile start switches with antenna on the market is provided with a separate antenna coils and a separate antenna support. The antenna coil is connected into PCB boards, and is then connected to the outside. The product structure is complex, the size is large, and the production cost is high.

SUMMARY OF THE INVENTION

The technical problem to be solved by the embodiments of the present disclosure is to provide a compact automobile start switch with antenna. The compact automobile start switch can simplify the assembly process, reduce the number of components, reduce the production cost, and at the same time have higher product quality stability.

In order to solve the above technical problems, an embodiment of the present disclosure provides a compact automobile start switch with antenna including a button, a push switch assembly and an antenna assembly module. The antenna assembly module is provided with an accommodating cavity in which the push switch assembly is arranged. The antenna assembly module includes an antenna module body, an antenna coil and a connector terminal. The antenna module body is provided with a winding area in which the antenna coil is arranged and a connector matching portion in which the antenna connector terminal is arranged. The antenna connector terminal comprises a connecting section, a fixing section and a terminal welding section and the antenna coil is directly connected with the terminal welding section by a wire.

The antenna module body may be produced by injection molding process and of high temperature resistant materials such as plastic materials PBT-GF30, PPA-GF30, PCT, etc. The winding area and the connector matching portion are integrally formed by an insert injection molding process. The connector terminal is fixed in connector matching portion by putting the connector terminal in a reserved hole of an injection mold and closing the mold for injection production. The antenna module body is provided with a finished switch product rear shell structure function.

As an improvement of the above solution, the button abuts against an upper end of the push switch assembly, the push switch assembly comprises an elastic part and a PCBA board, the button comprises a main panel and a guiding member, the main panel is provided at the upper end of the guiding member, the elastic part is provided with an elastic arch portion, a bottom surface of the elastic arch portion is provided with switch contact particles, and that the PCBA board is provided with two switch contact circuit poles at locations corresponding to the switch contact particles.

As an improvement of the above solution, the elastic part further comprises a ring-shaped upper skirt with a skirt notch, a housing is provided on a periphery of the antenna assembly module, and an pollution-proof opening is provided on an upper portion of the housing on a side corresponding to the skirt notch.

As an improvement of the above solution, the elastic part further comprises a cover and a lower skirt.

As an improvement of the above solution, the winding area is formed by an upper baffle and a lower baffle, the upper baffle and the lower baffle annularly protruding outwards from a side face of the antenna module body.

As an improvement of the above solution, the antenna connector terminal is fixedly connected to the antenna module body through its fixing section, its connecting section is arranged in the connector matching portion, its terminal welding section protrudes from the side face of the antenna module body, the PCBA board is connected with a switch circuit connector terminal, a connecting section of the switch circuit connector terminal is arranged in the connector matching portion, the antenna module and the antenna connector terminals are not connected to an electrical circuit on the PCBA board in any way, and the connector matching portion is configured to connect with a corresponding wiring harness of a whole vehicle.

As an improvement of the above solution, the lower baffle is provided with a locating hole, one end of the wire is connected to the antenna coil, and the other end of the wire extends from a periphery of the antenna module body to the terminal welding section through the locating hole, and is connected to the terminal welding section.

As an improvement of the above solution, the antenna module body is further provided with a groove on the side surface, the terminal welding section is arranged in the groove, and the wire is connected to the terminal welding section in the groove.

As an improvement of the above solution, the antenna module body is integrally formed by an insert injection molding process.

As an improvement of the above solution, the main panel is provided with a laser character, and the PCBA board is provided with a LED which is able to illuminate the laser character when emitting light.

Implementing the embodiments of the present disclosure has the following beneficial effects:

In the present application, the winding area is formed in the antenna module body, and the antenna coil is directly wound in the winding area. By forming the connector matching portion at the lower end of the antenna module body and having the terminal welding section of the antenna connector terminal protrude from the side face of the antenna module body, the antenna coil can be directly connected to the antenna connector terminal through the wire outside the antenna module body. The assembly process of connecting the antenna module to the electrical circuit of the PCBA is eliminated. The process of connecting the antenna to the two-pin female connector is eliminated. The antenna bracket and the finished product rear shell structure function is integrated. The number of components is reduced. The product quality stability is higher. And the production cost is lower.

The elastic part includes the cover. The upper skirt is annularly arranged along the upper edge of the cover, and the skirt notch is provided on the upper skirt. The elastic part also includes the skirt annularly arranged at the lower end to enclose the PCBA board. The pollution-proof opening is provided on the upper portion of the housing on the side corresponding to the skirt notch. The dust and water entering the switch can be discharged through two paths, which can improve the dust-proof and pollution-proof performance of the automobile start switch as a whole.

The antenna module body is further provided with a groove on the side surface, and the terminal welding section is arranged in the groove. The groove leaves operating space around the connection point of the wire and the terminal welding section, and the connection point of the wire and the terminal welding section is located in the groove to avoid contact with the housing and reduce the possible desoldering caused by friction and the like.

BRIEF DESCRIPTION OF THE PREFERRED EMBODIMENTS

In order to make the objectives, technical solutions and advantages of the present disclosure clearer, the present disclosure will be further described in detail below in conjunction with the accompanying drawings. Merely to declare that the terms "up", "down", "left", "right", "front", "rear", "inside", and "outside" appearing or about to appear in the text of the present disclosure are only based on the drawings of the present disclosure, and they do not specifically limit the present disclosure.

Figure 1:
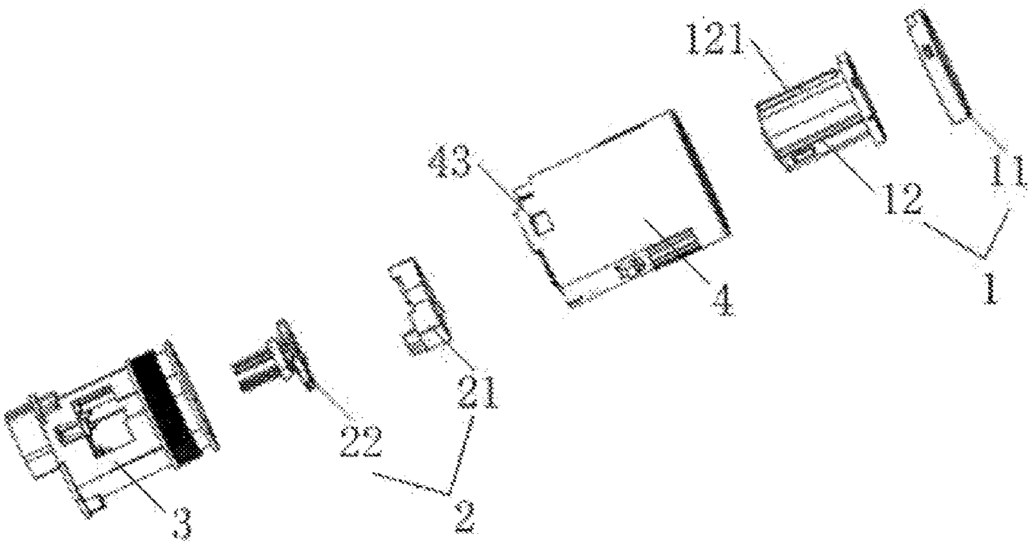
FIG. 1 is an exploded view of a compact automobile start switch with antenna according to the present disclosure.
Figure 2:
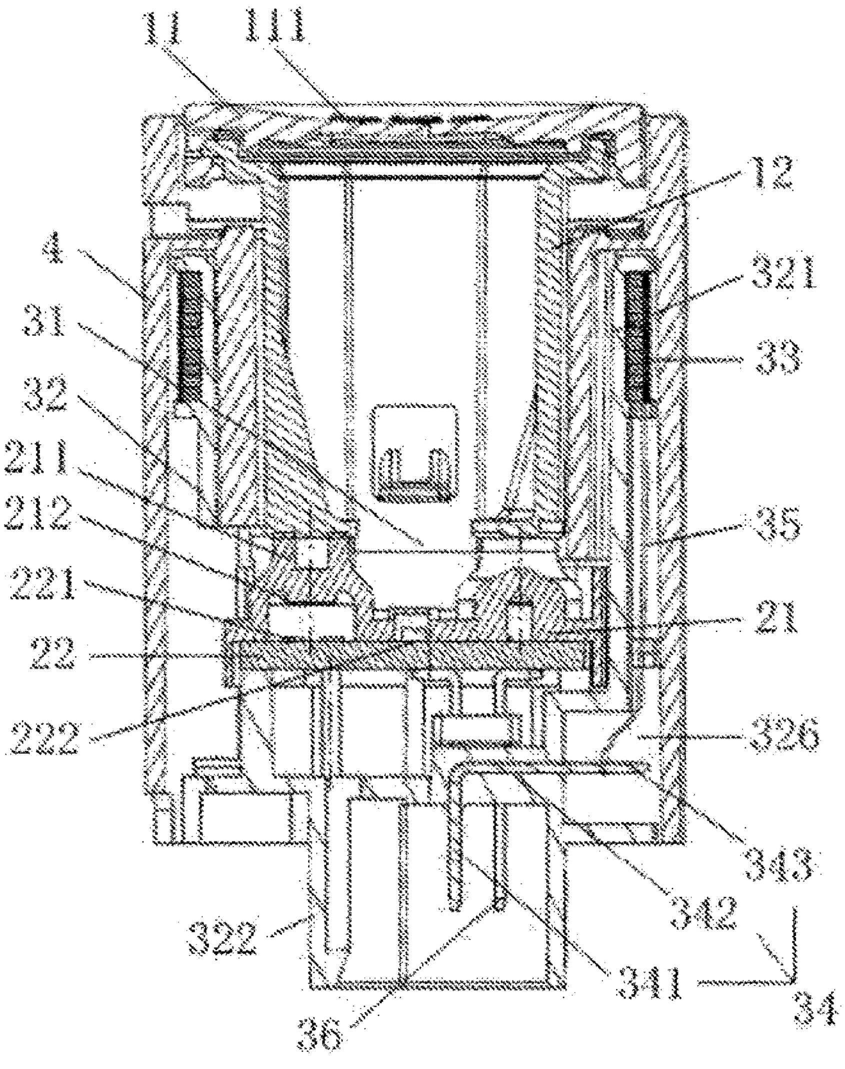
FIG. 2 is a cross-sectional view of a compact automobile start switch with antenna according to the present disclosure.

As shown in FIGS. 1 and 2, embodiments of the present disclosure provides a compact automobile start switch with antenna including a button 1, a push switch assembly 2 and an antenna assembly module 3. The antenna assembly module 3 is provided with an accommodating cavity 31 in which the push switch assembly 2 is arranged. The antenna assembly module 3 includes an antenna module body 32, an antenna coil 33 and a connector terminal 34. The antenna module body 32 is provided with a winding area 321 in which the antenna coil 33 is arranged and a connector matching portion 322 in which the antenna connector terminal 34 is arranged. The antenna connector terminal 34 comprises a connecting section 341, a fixing section 342 and a terminal welding section 343 and the antenna coil 33 is directly connected with the terminal welding section 343 by a wire 35. The wire 35 is preferably an enameled copper wire. The antenna module body 32 is provided with a finished switch product rear shell structure function, and the housing 4 can be fixed on the antenna module body through the finished switch product rear shell structure. Specifically, the finished switch product rear shell structure may be a buckle 327 protruding outward. The housing 4 is provided with a fixing hole 43 matching with the buckle 327. The housing 4 is sleeved from above the antenna module body 32 and the housing 4 and the antenna module body 32 fixed to each other until the buckle 327 snaps into the fixing hole 43.

In this solution, the winding area 321 is formed in the antenna module body 32, and the antenna coil 33 is directly wound in the winding area 321. By forming the connector matching portion 322 at the lower end of the antenna module body 32 and having the terminal welding section 343 of the antenna connector terminal 34 protrude from the side face of the antenna module body 32, the antenna coil 33 can be directly connected to the antenna connector terminal 34 through the wire 35 outside the antenna module body 32. The assembly process of connecting the antenna module to the electrical circuit of the PCBA is eliminated. The process of connecting the antenna to the two-pin female connector is eliminated. The antenna bracket and the finished product rear shell structure function is integrated. The number of components is reduced. The product quality stability is higher. And the production cost is lower.

Due to the integrated design of the antenna module body 32, the overall volume of the automobile start switch can be reduced, its diameter can be less than 32 mm, and its length can be less than 50 mm.

The specific structure of the automobile start switch is described in detail below.

Figure 3:
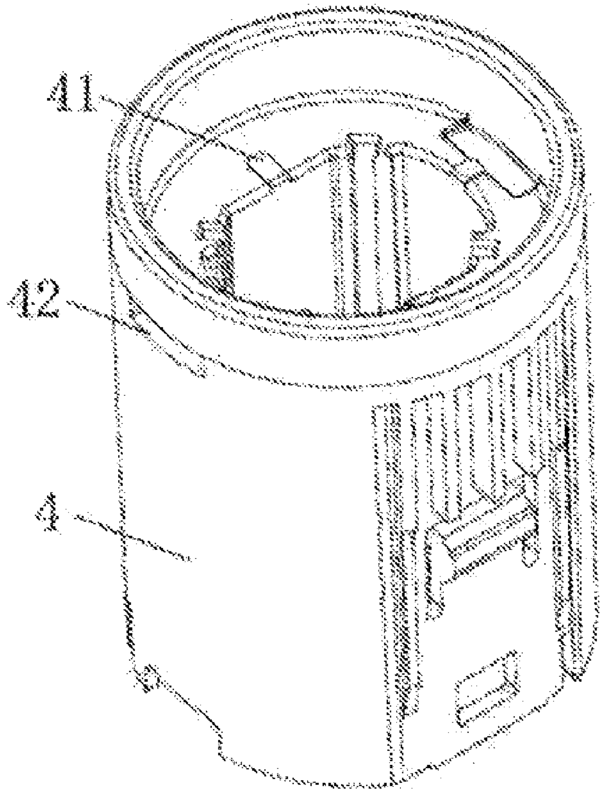
FIG. 3 is a schematic structural diagram of the housing of a compact automobile start switch with antenna according to the present disclosure.

The antenna module body 32 is integrally formed by an insert injection molding process. The button 1 abuts against the upper end of the push switch assembly 2, and the housing 4 is provided on the periphery of the antenna assembly module 3. The push switch assembly 2 includes an elastic part 21 and a PCBA board 22. As shown in FIG. 3, the button 1 includes a main panel 11 and a guiding member 12. The main panel 11 is provided on the upper end of the guiding member 12, and they are fixed together by a snap connection. A guiding rib 121 is provided on the outer face of the guiding member 12 and a guiding groove 41 is provided on the inner face of the housing 4. The guiding rib 121 cooperates with the guiding groove 41 so that the guiding member 12 is able to move up and down within the guiding range of the housing 4, preventing the guiding member 12 from rotating relative to the housing 4. The elastic part 21 may be integrally formed of elastic silicone. The elastic part 21 is provided with an elastic arch portion 211. When the elastic arch portion 211 is operated by a pressing force, it can be pressed downward and can rebound freely after being released, so that a button force and a displacement feel is generated during the pressing process of the button 1.

Figure 4:
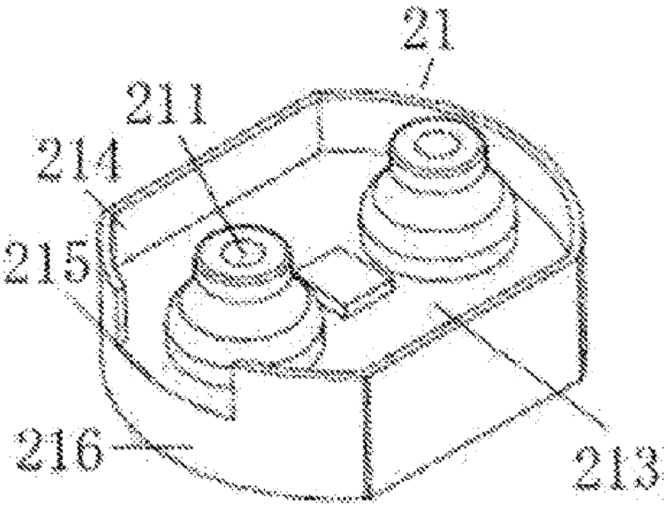
FIG. 4 is a schematic structural diagram of the elastic part of a compact automobile start switch with antenna according to the present disclosure.

As shown in FIG. 4, a bottom surface of the elastic arch portion 211 is provided with switch contact particles 212, and the switch contact particles 212 may be composed of conductive particles such as carbon particles, nickel particles, and gold particles. The PCBA board 22 is provided with two switch contact circuit poles 221 at locations corresponding to the switch contact particles 212. When the elastic arch portion 211 is pressed to contact the PCBA board 22 by the pressure from the button 1, the switch contact particles 212 contact the two switch contact circuit poles 221 on the PCBA board 22, so that a switch circuit is turned on. and the switch circuit sends an electrical signal to the switch circuit Connector terminal 34; when the button 1 is released, the elastic arch portion 211 rebounds, the switch contact particles 212 are separated from the switch contact circuit poles 221, the switch circuit is disconnected, and the electrical signal on the switch circuit connector terminal 34 changes. In order to realize the switch function of one-key start and stop of the automobile.

Figure 5:
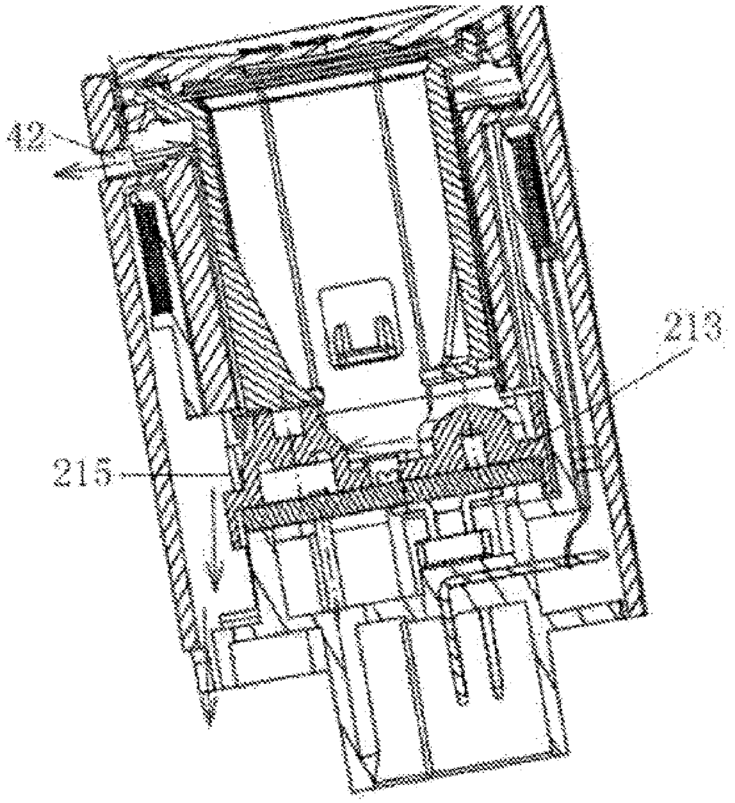
FIG. 5 is a schematic diagram of the pollution-proof and discharge structure of a compact automobile start switch with antenna according to the present disclosure.

As shown in FIG. 5, the arrow in the figure shows the pollution discharge path and direction. In order to satisfy the smooth relative movement between the button 1 and the housing 4, there must be a predetermined gap between the button 1 and the housing 4. Dust and water may enter from the gap during use, which will affect the smooth movement of the button 1 and the service life of the electronic components on the PCBA board 22. Therefore, this solution has designed a special pollution-proof and discharge structure. The elastic part 21 further includes a cover 213, an upper skirt 214 and a lower skirt 216 arranged annularly along the edge of the cover 213. The upper skirt 214 is provided with a skirt notch 215. The lower skirt 216 and the cover 213 collectively enclose the PCBA board 22. A pollution-proof opening 42 is provided on the side of the upper portion of the housing 4 corresponding to the skirt notch 215. The automobile start switch is installed obliquely in the vehicle at a certain angle. When water or dust enters the gap between the button 1 and the housing 4, due to gravity, part of the water or dust will reach the upper surface of the cover 213 of the elastic part 21 through the gap between the button 1 and the housing 4. Water and dust are blocked by the cover 213 and the upper skirt 214, and will not enter inside of the PCBA. The blocked water and dust are discharged through the skirt gap 215 to the outside of the switch; the other part of the water and dust is directly discharged outward through the pollution-proof opening 42. The combined effect of the above two mechanisms can improve the dust-proof and pollution-proof performance of the automobile start switch as a whole.

Figure 6:
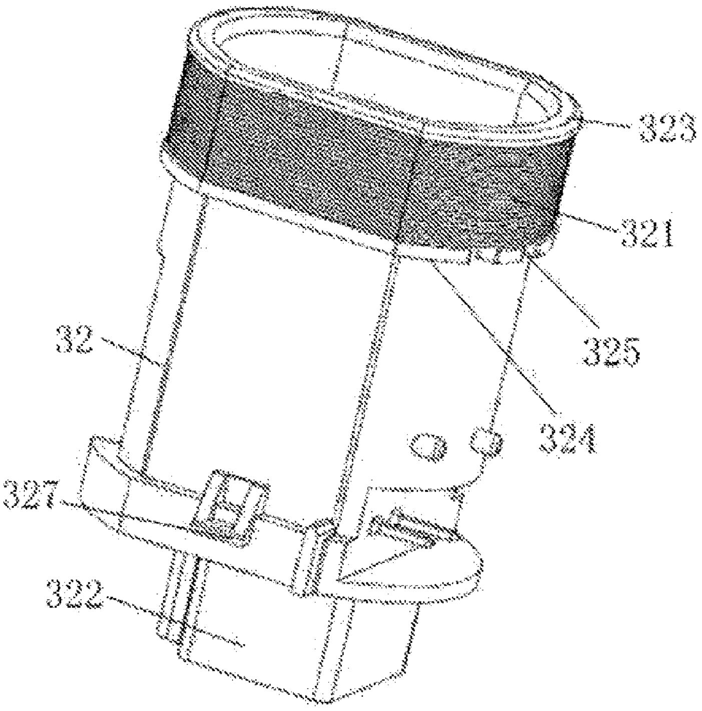
FIG. 6 is a schematic structural diagram of an antenna assembly module of a compact automobile start switch with antenna according to the present disclosure.

As shown in FIG. 6, in order to reduce the number of components and simplify the assembly process, the winding area 321 is surrounded by an upper baffle 323 and a lower baffle 324 annularly protruding outwards from a side face of the antenna module body 32. The antenna coil 33 is wound between the upper baffle 323 and the lower baffle 324. The antenna connector terminal 34 is fixedly connected to the antenna module body 32 through its fixing section 342, its connecting section 341 is arranged in the connector matching portion 322, its terminal welding section 343 protrudes from the side face of the antenna module body 32. The PCBA board 22 is connected with a switch circuit connector terminal 23, and a connecting portion 231 of the switch circuit connector terminal 23 is arranged in the connector matching portion 322. The connector matching portion 322 is configured to connect with a corresponding wiring harness of a whole vehicle. The lower baffle 324 is provided with a locating hole 325. One end of the wire 35 is connected to the antenna coil 33, and the other end passes through the locating hole 325 and extends from the periphery of the antenna module body 32 to the terminal welding section 343, and is connected to the terminal welding section 343. This solution breaks the conventional design in the prior art in which there is a special antenna assembly, the antenna assembly is need to be assembled on the antenna module body, and the antenna assembly is connected to the PCBA board located in the inner cavity of the antenna module body by a wire harness or a separate connector or a separate connector or welding. The present solution only need to weld the switch connector terminal 36 on the PCBA board 22 in advance. When the PCBA board 22 is installed in the antenna module body 32, the switch connector terminal 36 protrudes from the reserved hole at the bottom of the antenna module body 32 (not shown in the figure) and cooperate with the antenna connector terminal 34 integrally formed in the antenna module body 32. There is no need to perform any connection operations in the accommodating cavity 31, which greatly reduces the difficulty of assembly and improves the reliability of the product. The antenna module is connected to the terminal welding section 343 arranged on the side face of the antenna module body 32 through the wire 35. The assembly process is simple and reliable.

As shown in FIG. 2, in order to protect the connection point between the wire 35 and the terminal welding section 343, while further reduce the welding difficulty, the antenna module body 32 is also provided with a groove 326 on the side surface. The terminal welding section 343 is arranged in the groove 326, and the wire 35 and the terminal welding section 343 are connected in the groove 326. The groove 326 leaves operating space around the connection point of the wire 35 and the terminal welding section 343, and the connection point of the wire 35 and the terminal welding section 343 is located in the groove 326 to avoid contact with the housing 4 and reduce the possible desoldering caused by friction and the like.

In order to improve the aesthetics level of the switch and provide visual feedback for users, the main panel 11 is provided with laser characters 111, and the PCBA board 22 is provided with a LED 222. When the switch needs to make relevant prompts, the LED 222 is lit, and when the LED 222 emits light, the laser characters 111 can be illuminated.

The above are the preferred embodiments of the present disclosure. It should be pointed out that for those of ordinary skill in the art, without departing from the principle of the present disclosure, several improvements and modifications can be made, and these improvements and modifications are also considered to be within the protection scope of the present disclosure.

The invention claimed is:

1. A compact automobile start switch with antenna, comprising:

a button;

a push switch assembly comprising an elastic part; and an antenna assembly module, wherein the antenna assembly module is provided with an accommodating cavity in which the push switch assembly is arranged, wherein the antenna assembly module comprises an antenna module body, an antenna coil and a connector terminal, the antenna module body being provided with a winding area and a connector matching portion, and a finished switch product rear shell structure function, wherein the antenna coil is arranged in the winding area, the antenna connector terminal is arranged in the connector matching portion, wherein the antenna connector terminal comprises a connecting section, a fixing section and a terminal welding section, and the antenna coil is directly connected to the terminal welding section by a wire, and wherein the elastic part comprises a ring-shaped upper skirt with a skirt notch, wherein a housing is provided on a periphery of the antenna assembly module, and a pollution-proof opening is provided on an upper portion of the housing on a side corresponding to the skirt notch.

2. The compact automobile start switch with antenna according to claim 1, wherein the button abuts against an upper end of the push switch assembly, the push switch assembly comprising a PCBA board, the button comprising a main panel and a guiding member, wherein the main panel is provided at upper end of the guiding member, the elastic part is provided with an elastic arch portion which has a bottom surface provided with switch contact particles, and the PCBA board is provided with two poles of a switch contact circuit at locations corresponding to the switch contact particles.

3. The compact automobile start switch with antenna according to claim 2, wherein the elastic part further comprises a cover and a lower skirt.

4. The compact automobile start switch with antenna according to claim 1, wherein the winding area is formed by an upper baffle and a lower baffle annularly protruding outwards from a side face of the antenna module body.

5. The compact automobile start switch with antenna according to claim 3, wherein:

the antenna connector terminal is fixedly connected to the antenna module body through its fixing section, the connecting section of the antenna connector terminal is arranged in the connector matching portion, the terminal welding section of the antenna connector terminal protrudes from the side face of the antenna module body, the antenna module and the antenna connector terminal are not connected to an electrical circuit on the PCBA board in any way, the PCBA board is connected with a switch circuit connector terminal, a connecting section of the switch circuit connector terminal is arranged in the connector matching portion, and the connector matching portion is configured to connect with a corresponding wiring harness of a whole vehicle.

6. The compact automobile start switch with antenna according to claim 4, wherein the lower baffle is provided with a locating hole, one end of the wire is connected to the antenna coil, and the other end of the wire extends from a periphery of the antenna module body to the terminal welding section through the locating hole, and is connected to the terminal welding section.

7. The compact automobile start switch with antenna according to claim 1, wherein the antenna module body is further provided with a groove on the side surface, the terminal welding section is arranged in the groove, and the wire is connected to the terminal welding section in the groove.

8. The compact automobile start switch with antenna according to claim 1, wherein the antenna module body is integrally formed by an insert injection molding process.

9. The compact automobile start switch with antenna according to claim 2, wherein the main panel is provided with a laser character, and the PCBA board is provided with a LED which is able to illuminate the laser character when emitting light.

* * * * *